United States Patent
Maeda

[11] Patent Number: 6,047,132
[45] Date of Patent: Apr. 4, 2000

[54] CAMERA SYSTEM AND INTERCHANGEABLE LENS TO COMPENSATE FOR IMAGE BLUR WHEN PHOTOGRAPHING AT CLOSE RANGE

[75] Inventor: Toshiaki Maeda, Kanagawa-ken, Japan

[73] Assignee: Nikon Corporation, Tokyo, Japan

[21] Appl. No.: 09/260,719

[22] Filed: Mar. 2, 1999

[30] Foreign Application Priority Data

Mar. 4, 1998 [JP] Japan .................................. 10-052032

[51] Int. Cl.[7] ............................ G03B 17/00; G02B 27/64
[52] U.S. Cl. .................................. 396/53; 396/55; 359/554
[58] Field of Search ................................. 396/53, 55, 52; 348/208; 359/557

[56] References Cited

U.S. PATENT DOCUMENTS

| | | | |
|---|---|---|---|
| 5,335,032 | 8/1994 | Onuki et al. | 396/55 |
| 5,561,498 | 10/1996 | Sekine et al. | 396/53 |
| 5,649,237 | 7/1997 | Okazaki | 396/55 |
| 5,761,544 | 6/1998 | Sato et al. | 396/53 |
| 5,794,078 | 8/1998 | Okazaki | 396/53 X |

*Primary Examiner*—W. B. Perkey

[57] ABSTRACT

A camera system and interchangeable lens which can accurately compensate for motion causing image blur regardless of the subject range, by detecting motion having different properties. The camera system and interchangeable lens include a first motion detector having angular velocity sensors which detect blurring motion inclined to the optical axis, and a second motion detector having acceleration sensors to detect blurring motion which causes movement perpendicular to the optical axis. The second motion detector is located as close as possible to the film plane, between an aperture unit and a lens side mount unit. As a result, because the distance (radius of rotation) between an instantaneous rotation center, which exists close to the film plane, and the second motion detector becomes small, the effects of angular acceleration become small, and blurring motion can be accurately compensated.

19 Claims, 10 Drawing Sheets

CAMERA SYSTEM AND INTERCHANGEABLE LENS TO COMPENSATE FOR IMAGE BLUR WHEN PHOTOGRAPHING AT CLOSE RANGE

CROSS-REFERENCE TO RELATED APPLICATIONS

This application is based upon and claims priority of Japanese Patent Application No. 10-052032 filed Mar. 4, 1998, the contents being incorporated herein by reference.

BACKGROUND OF THE INVENTION

1. Field of the Invention

The present invention relates to a camera system and interchangeable lens having a motion compensation device which shifts a compensation lens to compensate for motion causing blur of an image formed on an image forming plane, such as motion caused by hand shake and the like. More specifically, the present invention relates to a motion compensation device for an optical system which can accurately detect and compensate for motion causing image blur when photographing at close range.

2. Description of the Related Art

Image blur suppression devices are known which suppress, or reduce, blurring of an image formed by an optical system on an image plane. A motion compensation device is a type of image blur suppression device which compensates for motion incident on an optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system.

Conventional cameras use a motion compensation device to suppress image blur resulting from motion of the camera. Such motion is typically caused by hand tremors of the photographer.

For example, Japanese Laid-Open Patent Publication JP-A-H3-46642 discloses a motion compensation device including a first angular velocity sensor to detect the angular velocity around a first axis which is at right angles to the optical axis of a photographic optical system, a second angular velocity sensor to detect the angular velocity around a second axis at right angles to the first axis, a first acceleration sensor to detect acceleration in a first axial direction, a second acceleration sensor to detect acceleration in a second axial direction, a rotational mechanism unit to rotationally drive an optical system around the first and second axes, and a servo circuit to drive control the rotational mechanism unit based on the output signals of the first and second angular velocity sensors and on the output signals of the first and second acceleration sensors.

However, the known motion compensation device can not accurately detect motion causing image blur when photographing at close range in spite of having angular velocity sensors and acceleration sensors to detect motion. As a result of the inability of the conventional motion compensation device to accurately detect motion, a problem occurs in that the motion causing image blur (blurring motion) can not be compensated with high accuracy.

SUMMARY OF THE INVENTION

It is an object of the present invention to overcome the problems of the conventional motion compensation devices and to provide a camera system and interchangeable lens which can accurately compensate for motion of an optical system causing image blur regardless of the subject range.

It is another object of the present invention to provide a motion compensation device which can accurately compensate for motion of an optical system causing image blur by detecting motion causing image blur having differing properties.

Objects and advantages of the present invention are achieved in accordance with embodiments of the present invention with a camera system comprising a parallel blurring motion detection unit to detect blurring motion which causes movement of a photographic optical system perpendicular to an optical axis (O) of the photographic optical system; and an angular blurring motion detection unit to detect blurring motion which causes movement of the photographic optical system in a direction inclined to the optical axis, wherein the parallel blurring motion detection unit is located closer to an imaging surface than the angular blurring motion detection unit.

The parallel blurring motion detection unit may be located between an aperture unit and the imaging surface. Further, the parallel blurring motion detection unit may be located in the neighborhood of the imaging surface.

The camera system may comprise a motion compensation optical system to compensate for motion causing image blur, a drive unit to drive the motion compensation optical system, and a control unit to drive control the drive unit based on output signals of at least one of the parallel blurring motion detection unit and the angular blurring motion detection unit.

The parallel blurring motion detection unit and the angular blurring motion detection unit may be mounted in a housing or in respective housings via a common fixed member.

The parallel blurring motion detection unit may comprise an acceleration detector to detect acceleration, and the angular blurring motion detection unit may comprise an angular velocity detector to detect angular velocity.

Objects and advantages of the present invention are achieved in accordance with embodiments of the present invention with an interchangeable lens which can be installed on a camera body having a body side mount unit, comprising a parallel blurring motion detection unit to detect motion which causes movement of a photographic optical system perpendicular to an optical axis (O) of the photographic optical system; an angular blurring motion detection unit to detect motion which causes movement of the photographic optical system in a direction inclined to the optical axis; a motion compensation optical system to compensate for motion causing image blur; a drive unit to drive the motion compensation optical system; a control unit to drive control the drive unit based on the output signal of at least one of the parallel blurring motion detection unit and the angular blurring motion detection unit; and a lens side mount unit coupled to the body side mount unit, wherein the parallel blurring motion detection unit is located between an aperture unit and an imaging surface.

The angular blurring motion detection unit of the interchangeable lens may be located between the aperture unit and the lens side mount unit. The parallel blurring motion detection unit of the interchangeable lens may be located more toward the lens side mount unit than the angular blurring motion detection unit.

The parallel blurring motion detection unit and the angular blurring motion detection unit of the interchangeable lens may be mounted in a lens barrel via a common fixed member.

The parallel blurring motion detection unit of the interchangeable lens may comprise an acceleration detector to detect acceleration, and the angular blurring motion detection unit may comprise an angular velocity detector to detect angular velocity.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
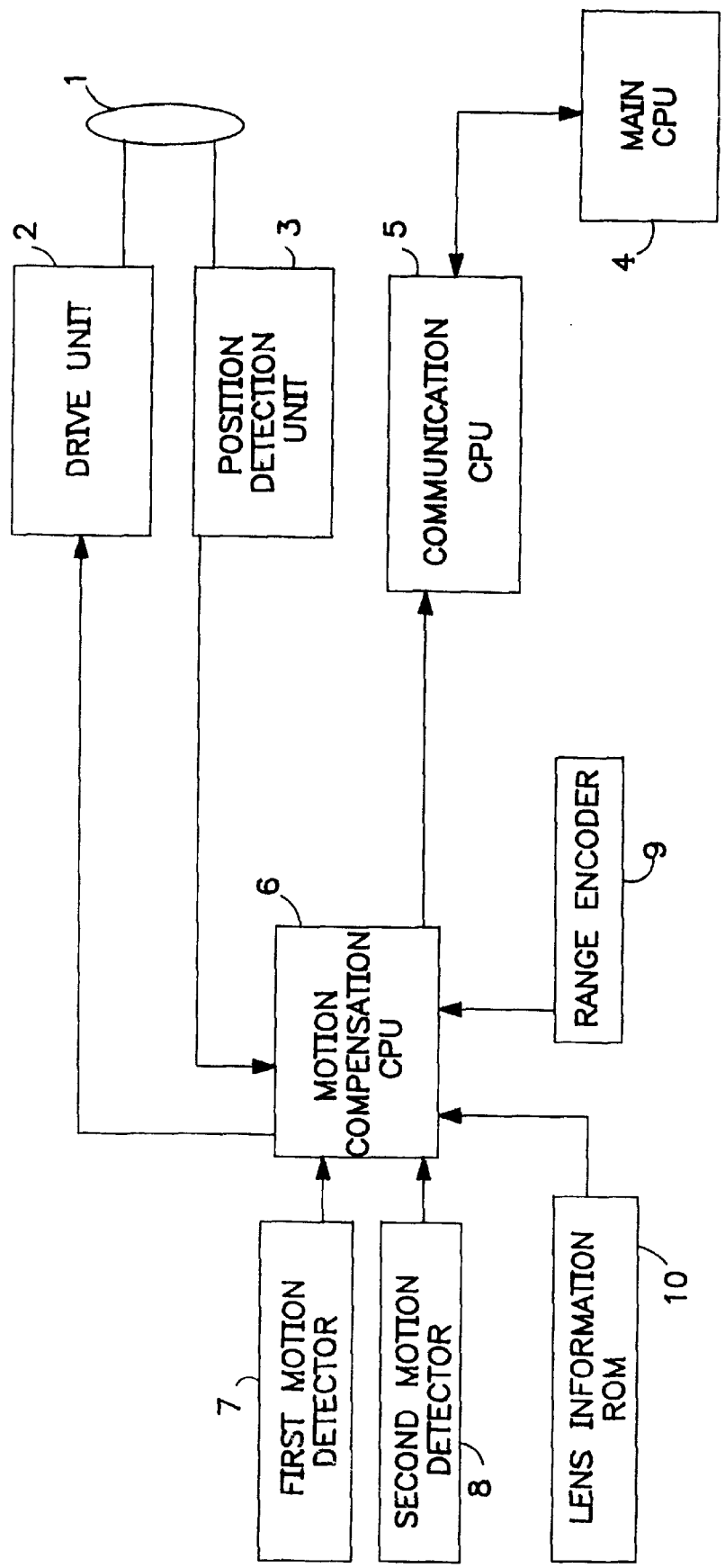
FIG. 1 is a block diagram of a camera system in accordance with a first embodiment of the present invention.

Reference will now be made in detail to the preferred embodiments of the present invention, examples of which are illustrated in the accompanying drawings, wherein like reference numerals refer to like elements throughout.

A first preferred embodiment of the present invention will now be described in detail hereinbelow with reference to FIGS. 1–8.

In accordance with the first preferred embodiment of the present invention, the camera system is described with respect to a motion compensation device included in a single lens reflex camera. However, the present invention is not limited in its application to a single lens reflex camera, and can be applied to a variety of different types of cameras or optical systems.

FIG. 1 is a block diagram of a camera system in accordance with the first embodiment of the present invention. As shown in FIG. 1, the camera system in accordance with the first embodiment of the present invention includes a motion compensation optical system 1, a drive unit 2, a position detection unit 3, a main CPU 4, a communication CPU 5, a motion compensation CPU 6, a first motion detector 7, a second motion detector 8, a range encoder 9 and a lens information ROM 10.

The motion compensation optical system 1 comprises at least a portion of a photographic optical system, and is an optical system which alters the light path of the photographic optical system. The motion compensation optical system 1 comprises, for example, a motion compensation lens which compensates for motion causing blur of an image formed by the photographic optical system by being driven in a direction which is not parallel to the optical axis, and preferably in a direction at right angles to or approximately at right angles to the optical axis, to optically shift the image formed by the photographic optical system.

The drive unit 2 drives the motion compensation optical system 1. The drive unit 2 comprises, for example, a voice coil motor or other type of drive mechanism to drive the motion compensation optical system 1 in a direction not parallel to the optical axis using an electromagnetic drive method. The drive unit 2 includes a motor to drive the motion compensation optical system 1 in an x-axis direction with respect to the optical axis and a motor to drive the motion compensation optical system in a y-axis direction with respect to the optical axis. The x-axis direction is preferably a vertical direction with respect to the optical axis, and the y-axis direction is preferably a horizontal direction with respect to the optical axis, with the x-axis and y-axis perpendicular to each other.

The position detection unit 3 detects the position of the motion compensation optical system 1 within a plane surface at a right angle to, or approximately at a right angle to the optical axis. The position detection unit 3 comprises, for example, an infrared light emitting element (IRED), a slit member which limits a light beam incident from the IRED and which is mounted in the motion compensation optical system 1, and a position detection element (PSD) on which the light beam which passes through the slit member is incident. The position detection unit 3 detects the position of the light which moves on the PSD by moving the slit member, and outputs drive position information of the motion compensation optical system 1 to the motion compensation CPU 6. The position detection unit 3 comprises a device to detect the position of the motion compensation optical system 1 in the x-axis direction, and a device to detect the position of the motion compensation optical system 1 in the y-axis direction.

The main CPU 4 is, for example, a central processing computing unit which controls the whole camera system. The main CPU 4 sends to the motion compensation CPU 6 command information relating to the commencement of a motion compensation operation, the finish of motion compensation, and the like, and selects whether or not to perform motion compensation operations based on information output by the motion compensation CPU 6 relating to the power supply capacity and the like. The main CPU 4 is connected to the communication CPU 5.

The communication CPU 5 is, for example, a central processing computing unit to perform transfer of information between the main CPU 4 and the motion compensation CPU 6. The communication CPU 5 connects the main CPU 4 and the motion compensation CPU 6 by serial communication.

The motion compensation CPU 6 is, for example, a central processing computing unit which calculates a subject range of the photographic lens based on pulse signals output by the range encoder 9, and calculates a motion compensation amount based on motion detection information output by the first motion detector 7 and the second motion detector 8, position detection information output by the position detection unit 3, the subject range and the like. The motion compensation CPU 6 drive controls the drive unit 2 based on the motion compensation amount.

Moreover, the motion compensation CPU 6 eliminates the direct current components from signals output from the first motion detector 7 and the second motion detector 8, such as components representing calculation error of the motion compensation amount. Further, the motion compensation CPU 6 reads out photographic magnification information from the lens information ROM 10 based on lens information and subject range information relating to the interchangeable lens read out from the lens information ROM 10.

The communication CPU 5, the first motion detector 7, the second motion detector 8, the range encoder 9, and the lens information ROM 10 are connected to the motion compensation CPU 6.

Figure 2:
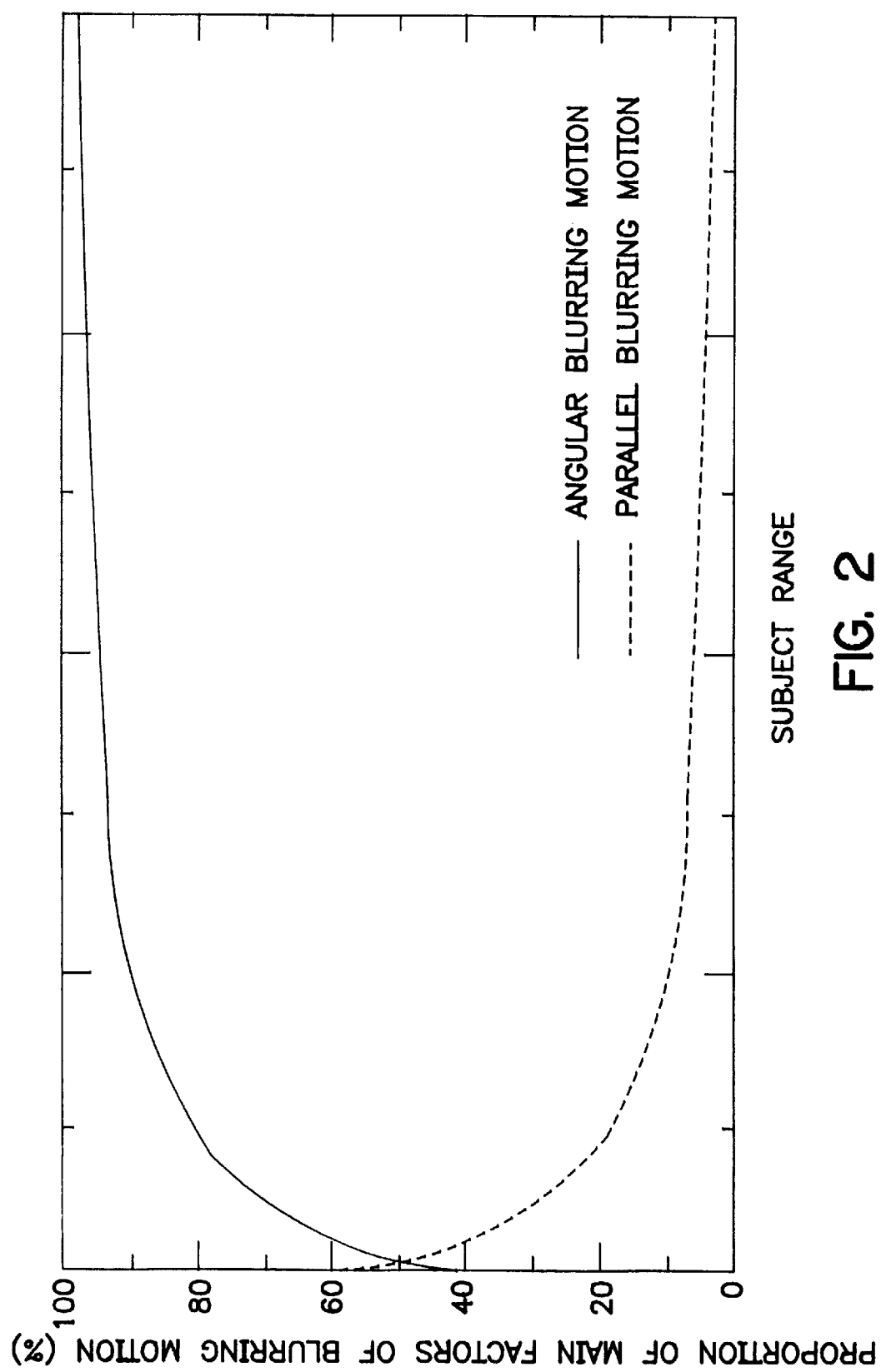
FIG. 2 is a graph showing proportions of the main factors of motion causing image blur with respect to the subject range in accordance with embodiments of the present invention.

FIG. 2 is a graph showing the proportion of the blurring motion primary factors with respect to the subject range in accordance with embodiments of the present invention. More particularly, FIG. 2 is a graph illustrating the proportions of angular motion causing image blur and parallel motion causing image blur with respect to subject range.

The motion causing image blur includes motion as a result of rotation around the x-axis and motion as a result of rotation around the y-axis, the x-axis and y-axis being perpendicular to each other and perpendicular to the optical axis (referred to hereinbelow as "angular blurring motion"), and motion as a result of displacement in the direction of the x-axis or y-axis (referred to hereinbelow as "parallel blurring motion"). The parallel blurring motion is motion in a plane that is parallel to a plane including the x-axis and the y-axis, such as the film plane 16. FIG. 2 schematically shows the results of respective substituted representative values of the angular blurring motion and parallel blurring motion when some focal distance of the photographic optical system is assumed. The abscissa represents the subject range, and the ordinate represents the proportion of the blurring motion amount in the image plane (e.g., film plane) occupied by the primary factors of angular blurring motion and parallel blurring motion.

As shown in FIG. 2, when the subject range (photographic range) is distant, the main factor contributing to blurring motion is angular blurring motion, and the blurring motion is almost all angular blurring motion. When the subject range is infinitely distant, the blurring motion is theoretically all angular blurring motion. The angular blurring motion can be determined by calculating an amount of angular change based on the output signals of angular velocity sensors which detect angular velocity.

When the subject range (photographic range) becomes close, the main factor contributing to blurring motion is not just primarily angular blurring motion, and the parallel blurring motion becomes a large factor contributing to blurring motion. Therefore, when the subject range is close, both the angular blurring motion and the parallel blurring motion must be taken into account as main factors of blurring motion.

Because the proportions of blurring motion occupied by the main factors of motion differ according to the subject range, blurring motion caused by vibration, such as hand termor, cannot be detected by a sensor which detects a single kind of physical quantity.

The first motion detector 7 shown in FIG. 1 is a sensor which detects the vibrational state of a camera system, and the like. The first motion detector 7 has the property of detecting angular blurring motion inclined to the optical axis. The first motion detector 7 may be, for example, a vibration gyro type of angular velocity sensor which detects angular velocity around an axis at right angles with respect to the optical axis. The first motion detector 7 includes a pitching detection sensor which detects the angular velocity around the x-axis (i.e., a vertical axis) which is at right angles to the optical axis, and a yawing detection sensor which detects the angular velocity around the y-axis (i.e., a horizontal axis) which is at right angles to the optical axis. The first motion detector 7 includes a processing circuit and the like (not shown in the drawing) which processes the detected vibration detection information (angular velocity signal).

The second motion detector 8 is a sensor which detects the vibrational state of a camera system. The second motion detector 8 has properties different from those of the first motion detector 7, and has the property of detecting parallel movement with respect to the optical axis which causes parallel blurring motion. The second motion detector 8 may be, for example, a piezo-resistor type, electrostatic capacitance type, or piezoelectric type of acceleration sensor. The second motion detector 8 includes a sensor for the x-axis direction which detects acceleration in the x-axis direction, and a sensor for the y-axis direction which detects acceleration in the y-axis direction, in order to detect motion in at least two (2) independent directions within a plane at right angles to the optical axis. The second motion detector 8 includes a processing circuit and the like (not shown in the drawing) which processes the detected vibration detection information (acceleration signal).

The range encoder 9 is an encoder to detect subject range information relating to the distance to the subject. The range encoder 9 detects the position of the photographic optical system, and outputs pulse signals to the motion compensation CPU 6 according to the detected position of the photographic optical system.

The lens information ROM 10 stores focal distance information relating to the focal distance, information related to lens characteristics, photographic magnification information corresponding to the combination of focal distance and subject range, and coefficients for the conversion of the pulse signals output by the range encoder 9 to the necessary physical quantities.

Figure 3:
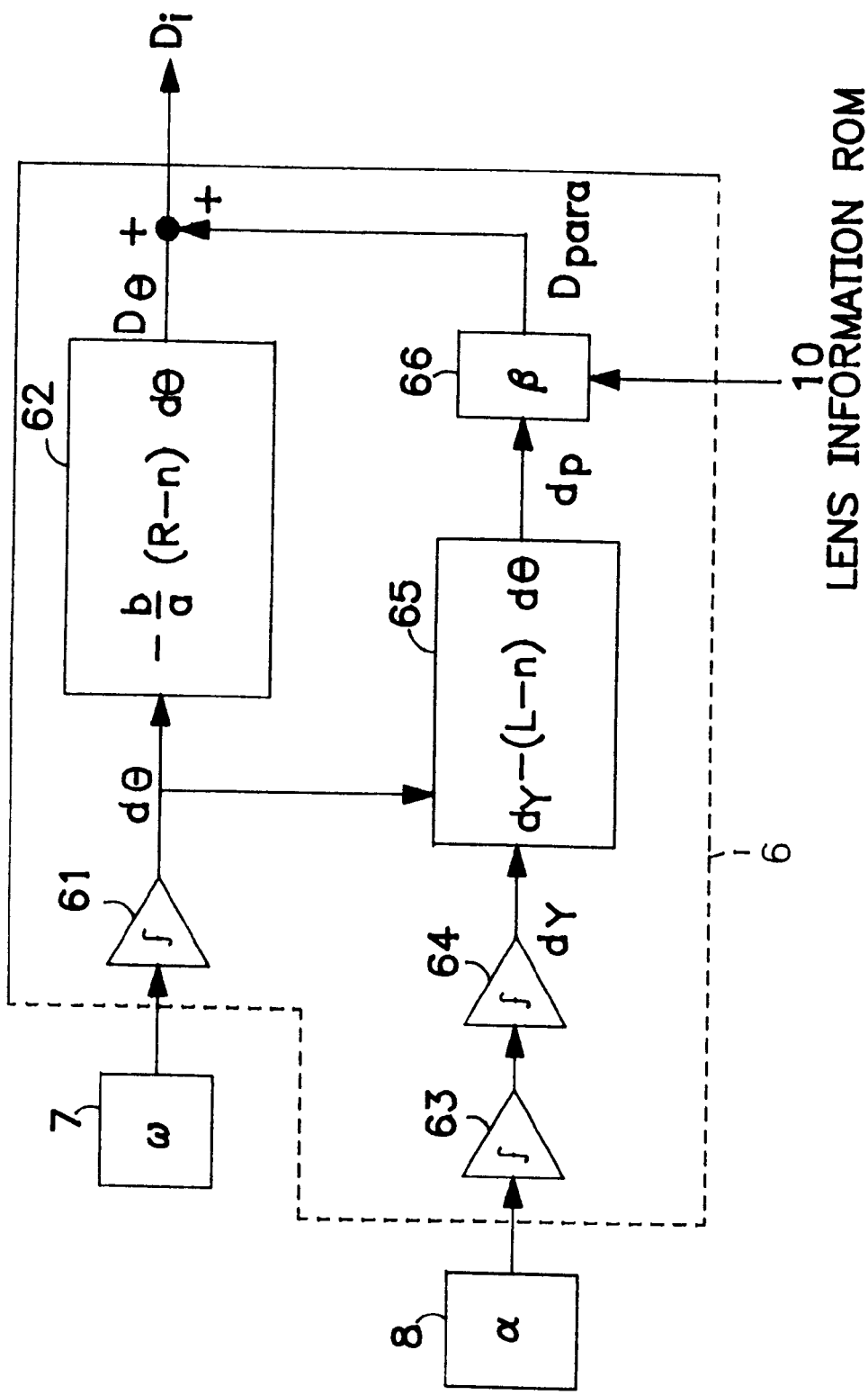
FIG. 3 is a block diagram illustrating a process for determining a motion amount in a camera system in accordance with the first embodiment of the present invention.

FIG. 3 is a block diagram illustrating a process performed by the motion compensation CPU 6 for determining the blurring motion amount in the camera system in accordance with the first embodiment of the present invention. More specifically, FIG. 3 is a diagram illustrating a calculation process for determining a blurring motion amount $D_i$ with respect to the angular velocity around one (1) axis and the acceleration in one (1) axis direction.

As shown in FIG. 3, the motion compensation CPU 6 includes an integrator 61, an angular displacement conversion unit 62, integrators 63, 64, a parallel displacement amount calculation unit 65, and a photographic magnification multiplication unit 66.

The integrator 61 performs a first order integration with respect to the unit time dt of a pitch direction angular velocity signal ω and a yaw direction angular velocity signal ω output by the first motion detector 7, and calculates an angular movement amount dθ with respect to the optical axis in the unit time dt. The integrator 61 outputs the angular movement amount dθ to the angular displacement conversion unit 62 and to the parallel displacement amount calculation unit 65.

The angular displacement conversion unit 62 calculates the angular blurring motion amount $D_θ$ based on the angular movement amount dθ calculated by the integrator 61.

The integrators 63, 64 perform a second order integration with respect to unit time dt of two directions perpendicular to the optical axis acceleration signal ac output by the second motion detector 8, and calculate a displacement amount $d_Y$ in unit time dt. The integrators 63, 64 output the displacement amount $d_Y$ to the parallel displacement amount calculation unit 65.

The parallel displacement amount calculation unit 65 calculates a displacement amount $d_p$ caused by parallel blurring motion based on the angular movement amount dθ calculated by the integrator 61 and the displacement amount $d_Y$ calculated by the integrators 63, 64. The parallel displacement amount calculation unit 65 outputs the displacement amount $d_p$ caused by parallel blurring motion to the photographic magnification multiplication unit 66.

The photographic magnification multiplication unit 66 calculates a parallel blurring motion amount $D_{para}$ by multiplying a photographic magnification β read out from the lens information ROM 10 and the displacement amount $d_p$ caused by parallel blurring motion. The photographic magnification multiplication unit 66 outputs the parallel blurring motion amount $D_{para}$ to the angular displacement conversion unit 62. The motion compensation CPU 6 calculates the blurring motion amount $D_i$ in the image plane, based on the angular blurring motion amount $D_θ$ calculated by the angular displacement conversion unit 62 and the parallel blurring motion $D_{para}$ calculated by the photographic magnification multiplication unit 66.

The process of calculating the blurring motion amount in the camera system in accordance with the first embodiment of the present invention will now be described hereinbelow.

Figure 4:
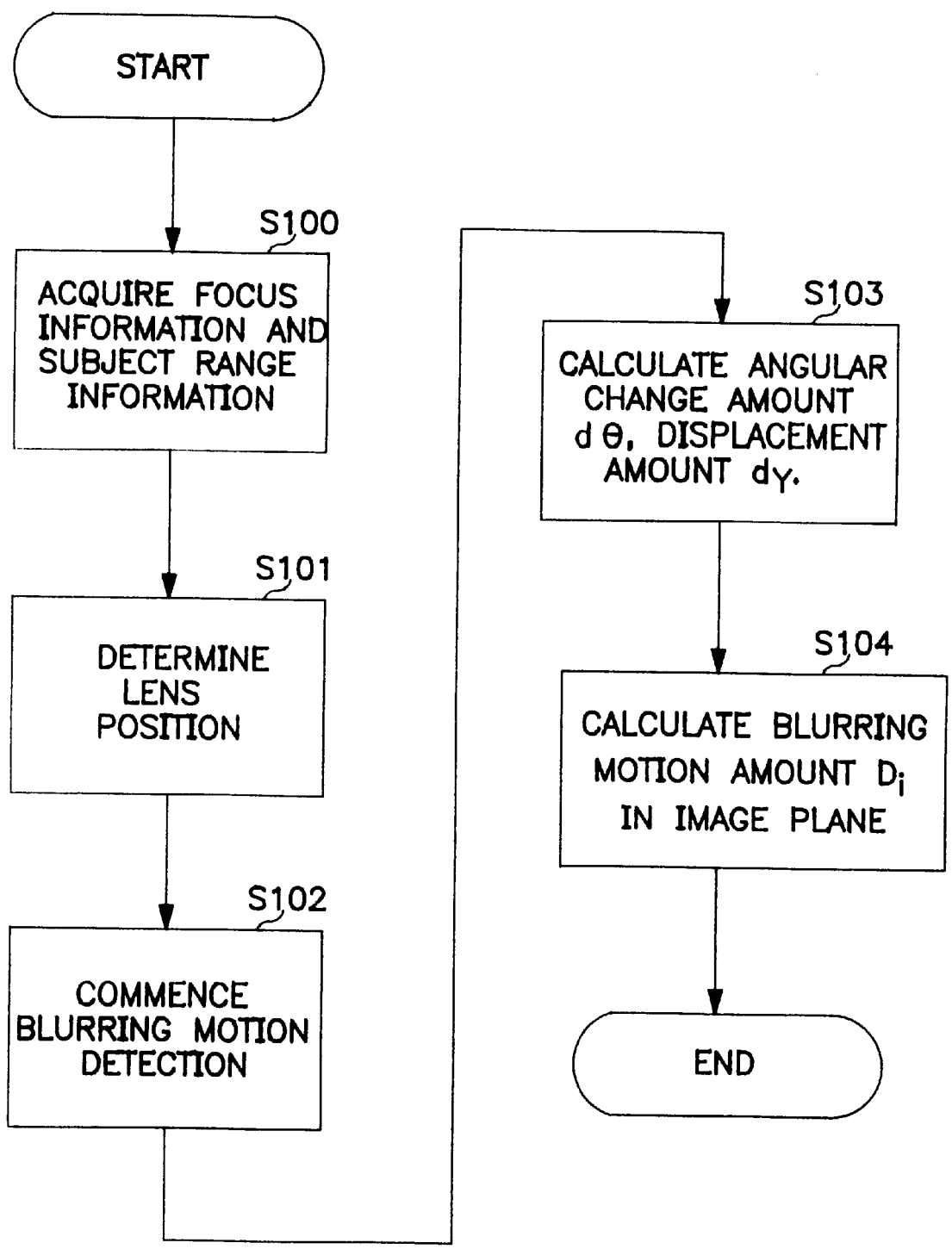
FIG. 4 is a flow chart illustrating an operational process for determining the amount of motion causing image blur using the motion compensation CPU in the camera system in accordance with the first embodiment of the present invention.

FIG. 4 is a flow chart illustrating an operational process for determining the blurring motion amount in the camera system in accordance with the first embodiment of the present invention.

In step ("S" hereinbelow) 100, the motion compensation CPU 6 acquires focal distance information and subject range information. The motion compensation CPU 6 calculates the subject range based on the focal distance information of the photographic optical system read out from the lens information ROM 10, and on the pulse signals output by the range encoder 9. Moreover, the motion compensation CPU 6 reads out the photographic magnification from the lens information ROM 10.

Next, in S101, the motion compensation CPU 6 determines the lens position. The motion compensation CPU 6 calculates the lens position based on the calculated photographic range.

In S102, the motion compensation CPU 6 commences blurring motion detection by the first motion detector 7 and the second motion detector 8. The motion compensation CPU 6, upon receiving a motion compensation commencement signal output by the main CPU 4 via the communication CPU 5, instructs a power supply circuit (not shown in the drawing) to provide a power supply to the first motion detector 7 and the second motion detector 8. As a result, the first motion detector 7 and the second motion detector 8 commence detection of the motion causing image blur which occurs in the camera system.

In S103, the motion compensation CPU 6 calculates the angular movement amount dθ and the displacement amount $d_Y$. As shown in FIG. 3, the integrator 61 calculates the angular movement amount dθ based on the angular velocity signal ω output by the first motion detector 7, and the integrators 63, 64 calculate the displacement amount $d_Y$ based on the acceleration signal α output by the second motion detector 8.

In S104, the motion compensation CPU 6 calculates the blurring motion amount $D_i$ in the image plane. The motion compensation CPU 6 calculates the blurring motion amount $D_i$ in the image plane, bringing together the angular blurring motion and the parallel blurring motion. The angular displacement conversion unit 62 calculates the angular blurring motion amount $D_θ$ using the following Equation 1.

$$D_θ = -β × θ × l \qquad \text{Equation 1:}$$

In Equation 1, β is the photographic magnification, θ is the motion angle, and l is the photographic range.

Moreover, the parallel displacement amount calculation unit 65 calculates the displacement amount $d_p$ caused by the parallel blurring motion, and the photographic magnification multiplication unit 66 calculates the parallel blurring motion amount $D_{para}$ using the following Equation 2.

$$D_{para} = -β × d_p \qquad \text{Equation 2:}$$

In Equation 2, $d_p$ is the displacement amount (amplitude) of motion caused by the parallel blurring motion.

The motion compensation CPU 6 calculates the motion amount $D_i$ in the image plane, which is the total blurring motion amount including the angular blurring motion amount $D_θ$ and the parallel blurring motion amount Dpara, using the following Equation 3.

$$D_i = D_{para} + D_θ \qquad \text{Equation 3:}$$

In Equation 3, the proportion Pθ which the angular blurring motion amount $D_θ$ occupies with respect to the motion amount Di in the image plane is obtained using the following Equation 4.

$$Pθ = D_θ/D_i = (θ·l)/(θ·l + d_p) \qquad \text{Equation 4:}$$

As shown in Equation 4, when the photographic range is infinitely far, theoretically, angular blurring motion completely occupies the main factor of blurring motion, but as the photographic range becomes closer, the proportion of blurring motion occupied by the parallel blurring motion becomes greater. In accordance with the first embodiment of the present invention, motion causing image blur is compensated for by calculating the compensation amount corresponding to the subject range, and, more specifically, by detecting plural motions with respective sensors and combining physical amounts detected by the different sensors.

The method of calculating the motion amount will now be described hereinbelow, distinguishing the case in which angular change exists with respect to the optical axis, and the case in which parallel change exists in addition to the angular change.

Figure 5:
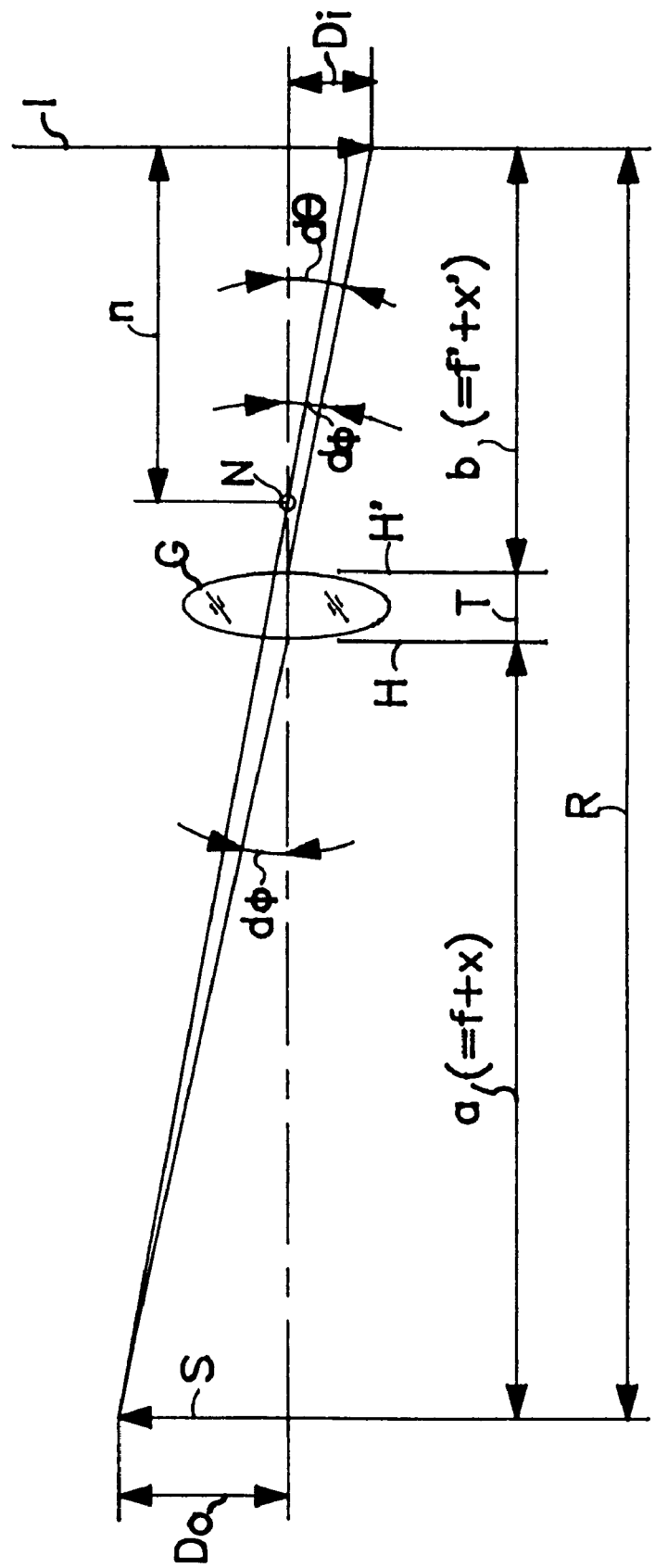
FIG. 5 is a diagram illustrating an amount of motion causing image blur when angular change occurs with respect to the optical axis in accordance with embodiments of the present invention.

FIG. 5 is a diagram used to describe the motion amount when an angular change with respect to the optical axis is present in accordance with embodiments of the present invention.

As shown in FIG. 5, a is the distance from a photographic object S to the front principal surface H of a photographic optical system G, and R is the distance from the photographic object S to the image plane I.

Moreover, the distance R is established by the relationship shown in Equation 5 below, where T is the thickness of the photographic optical system G, and b is the distance from a rear principal surface H' of the photographic optical system G to the image plane I.

$$R = a + T + b \quad \text{Equation 5:}$$

As shown in FIG. 5, during an infinitesimal time dt with respect to a static subject, the camera change is taken as an angular movement amount dθ, with a point N on the optical axis as rotation center, and with n as the distance from the rotation center N to the image plane I. In this case, when the optical axis of the camera is considered as a standard, the subject appears to change by an angular amount −dθ with the point N as center. Further, in FIG. 5, $D_o$ is a relative amount of the subject due to the change and −dφ is the amount of change of the angle of incidence of light from the subject to the photographic optical system G, as is established by the following Equation 6.

$$-d\phi = [(a+T+b-n) \times (-d\theta)]/a = [-d\theta \times (R-n)]/a \quad \text{Equation 6:}$$

The angular displacement conversion unit 62 calculates the motion amount $D_i$ in the image plane from the imaging relationship in Equation 7 below.

$$D_i = b \times (-d\phi) = -(b/a) \cdot (R-n) d\theta \quad \text{Equation 7:}$$

Figure 6:
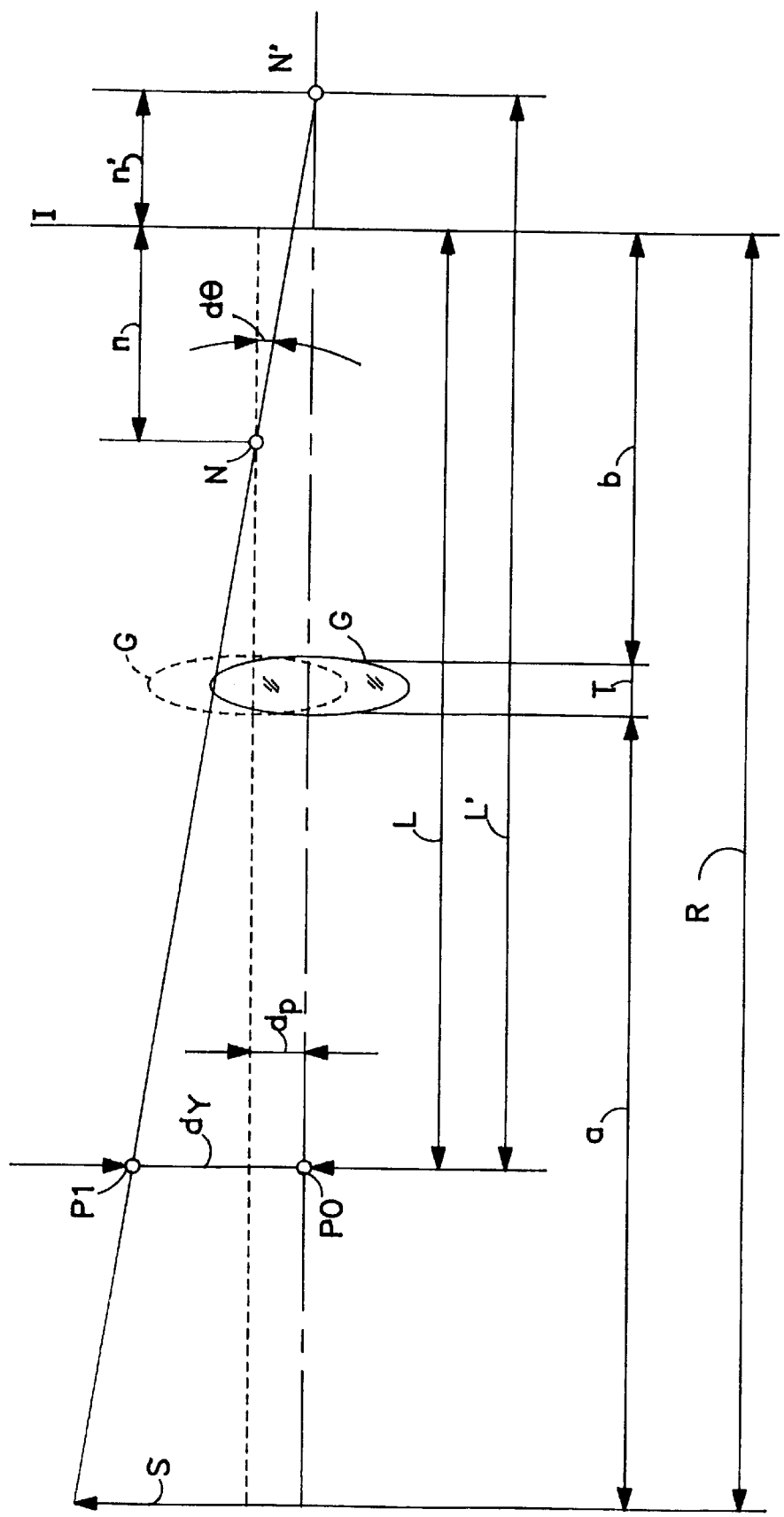
FIG. 6 is a diagram illustrating an amount of motion causing image blur when angular change occurs with respect to the optical axis in accordance with embodiments of the present invention.

FIG. 6 is a diagram used to describe the motion amount when both a parallel change and an angular change to the optical axis are present in accordance with embodiments of the present invention.

As shown in FIG. 6, L, for example, is the distance from the second motion detector 8 mounted in the lens barrel to the image plane I; $d_Y$ is an amount of displacement from a point P0 to a point P1, calculated by a second order integration of the acceleration signal α output by the second motion detector 8.

As shown in FIG. 6, the camera moves parallel by a displacement amount $d_p$ during an infinitesimal time dt from a time t0 to a time t1. Furthermore, when there is an angle change by an angular change amount dθ, the second motion detector 8 displaces from the point P0 to the point P1 during the infinitesimal time dt. The amount of change $d_Y$ can be considered to be a linear change when the amount of angular change dθ is infinitesimal.

Figure 7:
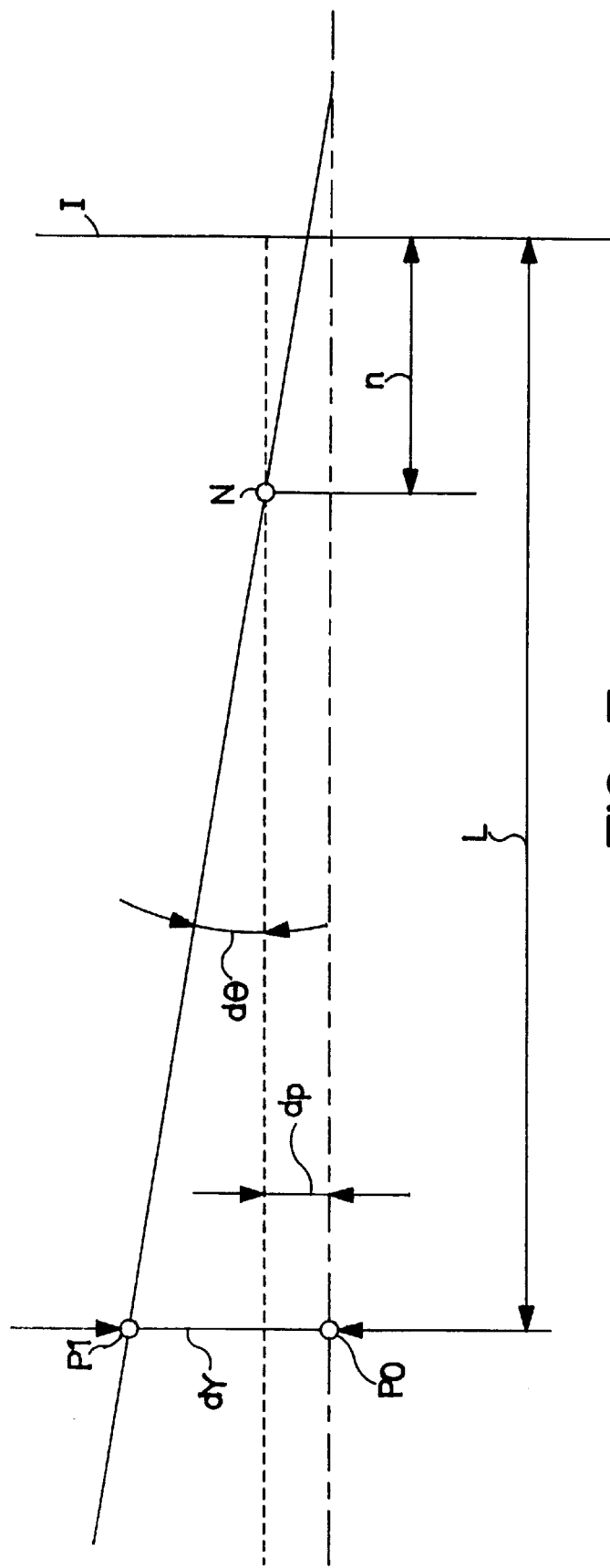
FIG. 7 is a diagram illustrating a method of determining an amount of parallel blurring motion in accordance with embodiments of the present invention.

FIG. 7 is a diagram used to describe a method of calculation of the parallel movement amount in accordance with embodiments of the present invention.

As shown in FIG. 7, the displacement amount $d_Y$ is the total of the displacement amount as a result of the angular blurring motion and the displacement amount caused by parallel blurring motion. The displacement amount $d_Y$ establishes a relationship between the angular change amount dθ and the displacement amount $d_p$ caused by parallel blurring motion, as represented by the following Equation 8.

$$(L-n)\tan d\theta = d_Y - d_p \quad \text{Equation 8:}$$

The parallel displacement amount conversion unit 65 calculates the displacement amount $d_p$ caused by parallel blurring motion, when the angular change amount dθ is infinitesimal, using the following Equation 9.

$$d_p = d_Y - (L-n)d\theta \quad \text{Equation 9:}$$

The photographic magnification unit 66 calculates the parallel blurring motion amount $D_{para}$ in the image plane according to the following Equation 10, multiplying the displacement amount $d_p$ by the photographic magnification β.

$$D_{para} = -\beta \times d_p \quad \text{Equation 10:}$$

The motion amount $D_i$ in the image plane is the total of the angular blurring motion amount $D_\theta$ and the parallel blurring motion amount $D_{para}$. The motion compensation CPU 6 calculates the motion amount $D_i$ in the image plane according to the following Equation 11.

$$D_i = D_\theta + D_{para} = -(b/a) \cdot (R-n) d\theta - \beta \cdot d_p = -(b/a) \cdot \{(R-L)d\theta + \beta d_Y\} \quad \text{Equation 11:}$$

The thickness T of the photographic optical system G, the distance b and the focal distance f can be calculated based on the pulse signals of the range encoder 9 and the lens information stored in the lens information ROM 10. Moreover, the distance a and the distance R, which are residual variables, can be calculated using Newton's imaging equation.

In the above-described manner, the motion compensation CPU 6 calculates the motion amount $D_i$ in the image plane using Equations 5–11.

In the case that the second motion detector 8 is an acceleration sensor, when the distance L is known, it is theoretically possible to calculate the position of the acceleration sensor. However, for example, when the acceleration sensor is installed in the lens barrel, there is a possibility that, in actuality, a difference arises because of the mounting location and the installation position. As a result, when the installation position of the acceleration sensor is not taken into account, there is a possibility that sufficient detection accuracy cannot be obtained.

Generally, three kinds of accelerations exist in the accelerations detected by the acceleration sensor, specifically, parallel acceleration arising as a result of motion in the translational direction with respect to the detection axis, gravitational acceleration caused by gravity, and rotary acceleration caused by rotary motion. Parallel acceleration and gravitational acceleration do not give rise to differences caused by the distance L (mounting length). On the other hand, rotary acceleration in a rotary direction (angular acceleration aω) can be expressed by the following Equation 12.

$$a\omega 32 \, \omega \times m \quad \text{Equation 12:}$$

In Equation 12, ω is angular acceleration in a rotary direction, and m is a rotary radius of an instantaneous rotation center.

The instantaneous rotation center is experimentally confirmed to centralize the rotation center close to the image plane I. It is preferable to locate the acceleration sensor as close as possible to the image plane I such that the rotary radius m is small to make the influence of the rotary acceleration aω small, in order that cumulative errors are not large. For example, when an acceleration sensor is mounted in an interchangeable lens, it is preferable to locate the acceleration sensor as close as possible to a lens side mount unit which comprises a standard position of the lens barrel.

Figure 8:
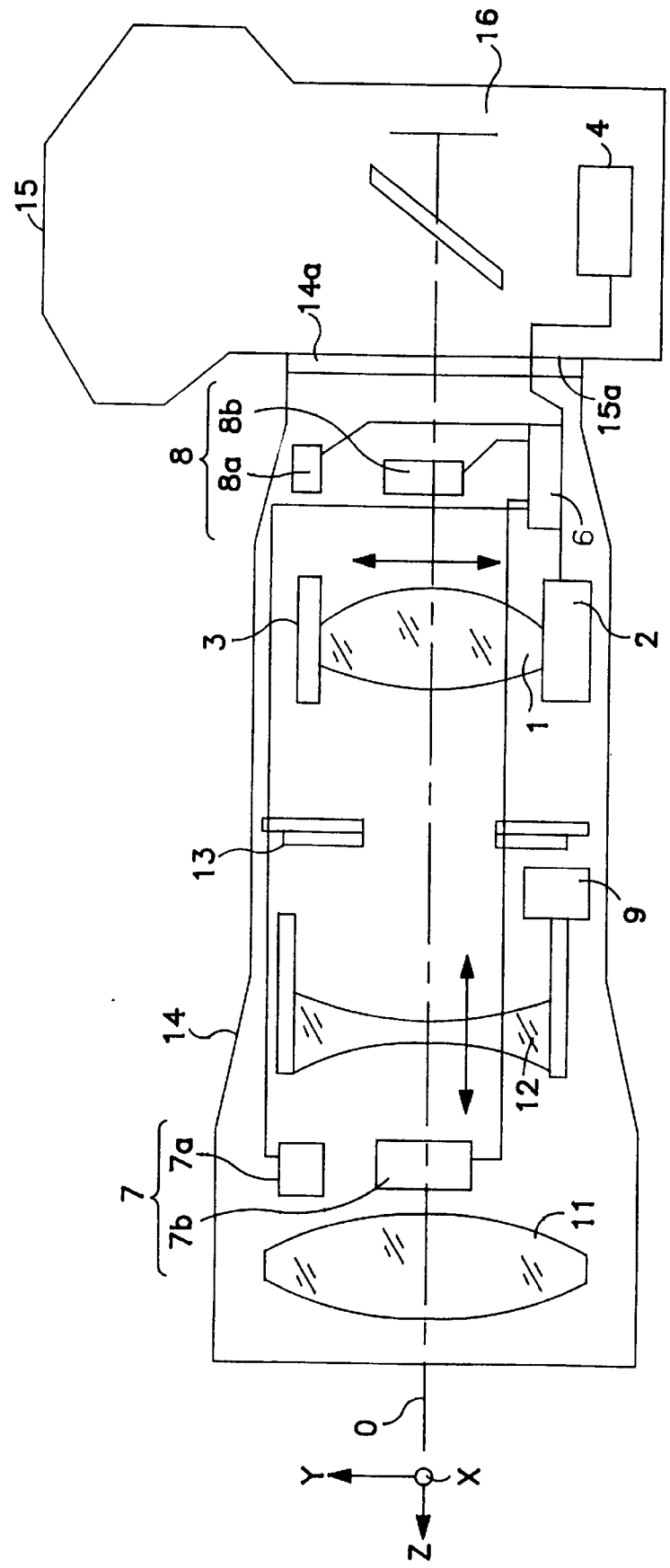
FIG. 8 is a block diagram showing the positional relationship of a first motion detector and a second motion detector in the camera system in accordance with the first embodiment of the present invention.

FIG. 8 is a block diagram showing the positional relationship of the first vibration detector and the second vibration detector in a camera system in accordance with the first embodiment of the present invention. Elements shown in FIG. 8 which are the same as those shown in FIG. 1 are referred to by like reference numerals.

As shown in FIG. 8, the interchangeable lens 14 includes a motion compensation CPU 6, a first motion detector 7, a second motion detector 8, a first lens group 11, a second lens group 12 (zoom optical system) which is movable, moving in the direction of the optical axis O and continuously changing the focal distance, a range encoder 9 to detect the position of the second lens group 12 in the optical axis O direction, a drive unit 2, a position detection unit 3, an aperture unit 13 and the like. A lens side mount unit 14a is formed in the interchangeable lens 14, and is in freely detachable engagement with a body side mount unit 15a of the camera body 15.

Moreover, the first motion detector 7 includes a pitching detection sensor 7a to detect angular velocity around the x-axis, and a yawing detection sensor 7b to detect angular velocity around the y-axis. The second motion detector 8 includes an x-axis detection sensor 8a to detect acceleration in the x-axis direction, and a y-axis detection sensor 8b to detect acceleration in the y-axis direction.

The aperture unit 13 limits the light beams, or the amount of light, which passes through the photographic optical system. The aperture unit 13 comprises an aperture mechanism to continuously vary the aperture concentrically, an aperture drive unit to drive the aperture mechanism, and the like.

The camera body 15 includes a main CPU 4 and the like. A body side mount unit 15a is formed in the camera body 15.

As shown in FIG. 8, in accordance with the first embodiment of the present invention, on the subject side from the aperture unit 13, the first motion detector 7 is located between the first lens group 11 and the second lens group 12.

Moreover, the second motion detector 8, which is an acceleration sensor, is preferably disposed as close as possible to the film plane 16. Because of this, in accordance with the first embodiment of the present invention, the second motion detector 8 is located more rearward in the interchangeable lens 14 than the aperture unit 13, and is also between the motion compensation optical system 1 and the lens side mount unit 14a.

The camera system and interchangeable lens barrel in accordance with the first embodiment of the present invention has the following advantageous effects.

The camera system includes a first motion detector 7 which is preferably an angular velocity sensor, and a second motion detector 8 which is preferably an acceleration sensor. Accordingly, the camera system can detect and compensate for angular blurring motion, and, in addition, the effect of parallel blurring motion is not neglected, even under photographic conditions with high photographic magnification at a close range. Further, the camera system can be designed for an increase of motion compensation power, accurately detecting motion.

Moreover, blurring motion can be compensated with high accuracy by calculating the motion compensation amount while changing the weighting of the output signals of the plural motion detectors (the first motion detector 7 and the second motion detector 8) having different properties, according to the photographic conditions, such as the focal distance of the photographic optical system and the subject range.

In accordance with the first embodiment of the present invention, the second motion detector 8 is located closer to the film plane 16 (image plane) than the first motion detector 7. As a result, the rotation radius m becomes small, and because the effect of the rotational acceleration (angular acceleration) oa is lessened, blurring motion can be compensated with high accuracy.

In accordance with the first embodiment of the present invention, the second motion detector 8 is located toward the lens side mount unit 14a, between the aperture unit 13 and the film plane 16, to insure location space for the aperture unit 13, AF drive unit and the like, which occupy a large exclusive area within the lens barrel. Because of this, by locating the second motion detector 8 more rearward than the aperture unit 13 whose mounting space is easily insured, the effect of the rotational acceleration (angular acceleration) can be made small.

Figure 9:
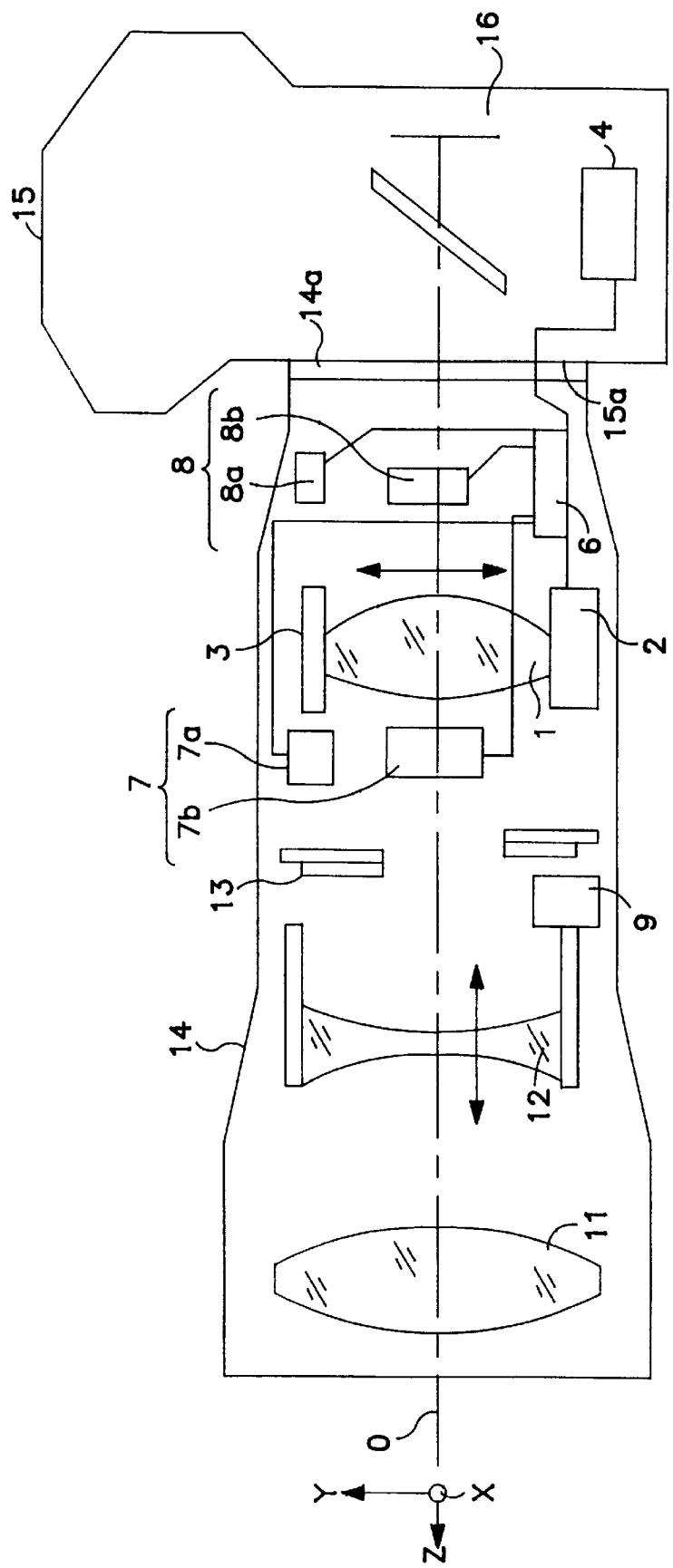
FIG. 9 is a block diagram showing the positional relationship of a first motion detector and a second motion detector in a camera system in accordance with a second embodiment of the present invention.

FIG. 9 is a block diagram showing the positional relationship of the first motion detector 7 and the second motion detector 8 in a camera system in accordance with a second preferred embodiment of the present invention. The elements which are the same as or similar to elements shown in FIGS. 1–8 are referred to by the same reference numbers, and a detailed description of the like elements is omitted.

The camera system according to the second embodiment of the present invention differs from that of the first embodiment in that the first motion detector 7 is disposed on the rearward side of the aperture unit 13. As shown in FIG. 9, in accordance with the second embodiment of the present invention, the first motion detector 7 is located between the aperture unit 13 and the motion compensation optical system 1.

The camera system in accordance with the second embodiment of the present invention has the following advantageous effects in addition to the effects of the first embodiment.

In accordance with the second embodiment of the present invention, the first motion detector 7 is located between the aperture unit 13 and the motion compensation optical system 1. Because the second lens group 12 moves back and forth along the optical axis according to the subject range, it is difficult to insure location space of the first motion detector 7 forward of the aperture unit 13. Accordingly, by locating the first motion detector 7 rearward of the aperture unit 13 where it is easy to insure mounting space, and space within the lens barrel can be efficiently used.

Figure 10:
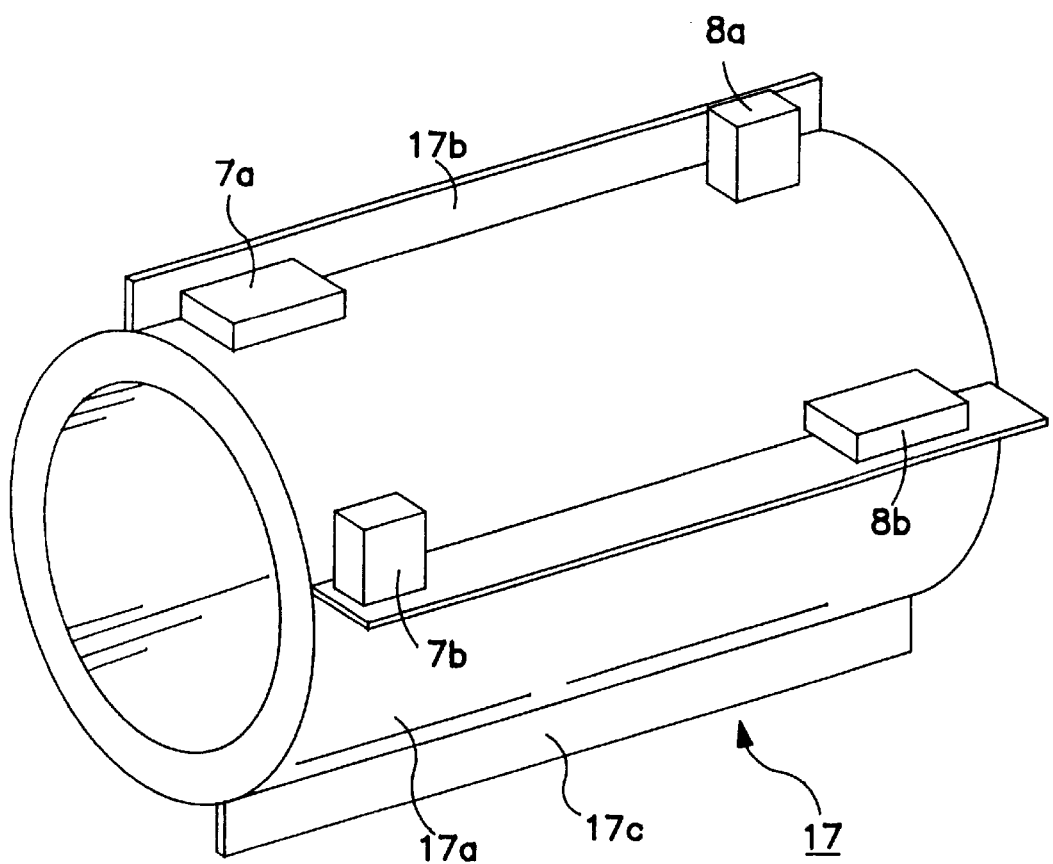
FIG. 10 is a perspective diagram showing a fixed member in a camera system in accordance with a third embodiment of the present invention.

FIG. 10 is a perspective diagram showing a fixed member in a camera system in accordance with a third preferred embodiment of the present invention. Furthermore, the elements shown in FIG. 10 which are the same as or similar to elements shown in FIGS. 1, 8 and 9 are referred to by the same reference numerals, and a detailed description of the like elements is omitted.

As shown in FIG. 10, a fixed member 17 is a member comprising a cylindrical body 17a and, formed on the external circumference of the cylindrical body 17a, a first fixed unit 17b and a second fixed unit 17c. The fixed member 17 is located within the interchangeable lens 14, and is fixedly mounted to the fixed tube of the lens barrel.

The first fixed unit 17b fixes the pitching detection sensor 7a and the x-axis detection sensor 8a. The first fixed unit 17b is parallel to the optical axis O when the cylindrical body 17a is mounted within the lens barrel.

The second fixed unit 17c fixes the yawing detection sensor 7b and the y-axis detection sensor 8b. The second fixed unit 17c is formed in a position approximately 90° to the first fixed unit 17b with the optical axis O as a center. The second fixed unit 17c is parallel to the optical axis O when the cylindrical body 17a is mounted within the lens barrel.

The camera system in accordance with the third embodiment of the present invention integrates as a unit the mounting of the first motion detector 7 and the second motion detector 8.

In accordance with the third embodiment of the invention, the camera system can be designed to shorten the production process and save labor when fixing the first motion detector 7 and the second motion detector 8 within the interchangeable lens 14, and, in addition, the adjustment of the respective mounting positions becomes easy, and positional accuracy can be increased.

The present invention is not limited to the embodiments described hereinabove, and various modifications and alterations are possible as stated hereinbelow, and likewise fall within the scope of the present invention.

The preferred embodiments of the present invention have been described with respect to the example of a single lens reflex camera. However, the present invention can be applied to an integral lens type of camera. In this case, the first motion detector 8 is located close to the film plane 16. The fixed member 17 is then fixedly mounted to the housing of the camera.

Moreover, the application of the present invention is not limited to still cameras, but can also include digital still cameras, video cameras, and the like, or binoculars, telescopes and the like optical instruments.

The preferred embodiments of the present invention have been described using the example of an interchangeable lens 14 of a single lens reflex camera. However, but the present invention can also be applied to a camera body or intermediate adapter. In this case, the fixed member 17 is fixedly mounted in a housing of the camera body or intermediate adapter.

The preferred embodiments of the present invention have been described using the example of an angular velocity sensor as the first motion detector 7; however, an angular acceleration sensor which detects angular acceleration can suitably be applied as the first motion detector 7.

Moreover, the first motion detector 7 may include a rolling detection sensor which detects rotation around the optical axis O, and the second motion detector 8 may include a z-axis detector which detects accelerations in the direction of the optical axis O.

Furthermore, the first motion detector 7 and the second motion detector 8 may be respective sensor groups, or may be single components. For example, the second motion detector 8 may be an acceleration sensor which detects motion in two (2) axes or three (3) axes simultaneously.

In accordance with embodiments of the present invention described in detail hereinabove, because the parallel blurring motion detection unit which detects parallel blurring motion is located more toward the imaging plane than is the angular blurring motion detection unit which detects angular blurring motion, the effects of rotary acceleration (angular acceleration) become small, and motion can be compensated with high accuracy.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A camera system, comprising:
 a first motion detection unit to detect motion inclined to an optical axis of a photographic optical system; and
 a second motion detection unit to detect motion not inclined to the optical axis,
 wherein the second motion detection unit is located closer to an imaging surface than the first motion detection unit.

2. A camera system as recited in claim 1, wherein the camera system further comprises an aperture unit and the second motion detection unit is located between the aperture unit and the imaging surface.

3. A camera system as recited in claim 1, wherein the second motion detection unit is located in the neighborhood of the imaging surface.

4. A camera system as recited in claim 3, wherein the second motion detection unit is located closer to the imaging surface than the first motion detection unit.

5. A camera system as recited in claim 2, wherein the photographic optical system includes a first lens group and a second lens group, and the first motion detection unit is located between the first lens group and the second lens group.

6. A camera system as recited in claim 2, further comprising a motion compensation optical system, wherein the first motion detection unit is located between the aperture unit and the motion compensation optical system.

7. A camera system as recited in claim 1, further comprising:
 a motion compensation optical system to compensate for motion causing image blur;
 a drive unit to drive the motion compensation optical system; and
 a control unit to control the drive unit to drive the motion compensation optical system based on output signals of at least one of the first motion detection unit and the second motion detection unit.

8. A camera system as recited in claim 4, wherein the control unit controls the drive of the motion compensation optical system based on a combination of output signals of the first motion detection unit and the second motion detection unit.

9. A camera system as recited in claim 4, wherein the second motion detection unit is located between the motion compensation optical system and the imaging surface.

10. A camera system as recited in claim 7, wherein the first motion detection unit and the second motion detection unit are mounted in a housing via a common fixed member.

11. A camera system as recited in claim 1, wherein the first motion detection unit is an angular velocity sensor to detect angular velocity, and
 the second motion detection unit is an acceleration detector to detect acceleration.

12. An interchangeable lens installable on a camera body having a body side mount unit, comprising:
 a first motion detection unit to detect motion inclined to an optical axis of a photographic optical system;
 a second motion detection unit to detect motion not inclined to the optical axis;
 a motion compensation optical system to compensate for motion causing image blur;
 a drive unit to drive the motion compensation optical system;
 a control unit to control the drive unit to drive the motion compensation optical system based on the output signal of at least one of the first motion detection unit and the second motion detection unit; and
 a lens side mount unit coupled to the body side mount unit, wherein
 the second motion detection unit is located between an aperture unit and an imaging surface.

13. An interchangeable lens as recited in claim 12, wherein the second motion detection unit is located between the aperture unit and the lens side mount unit.

14. An interchangeable lens as recited in claim 13, wherein the second motion detection unit is located closer to the lens side mount unit than the first motion detection unit.

15. An interchangeable lens as recited in claim 12, wherein the first motion detection unit and the second motion detection unit are mounted in a lens barrel via a common fixed member.

16. An interchangeable lens as recited in claim 12, wherein the first motion detection unit is an angular velocity detector to detect angular velocity, and the second motion detection unit is an acceleration detector to detect acceleration.

17. An interchangeable lens as recited in claim 12, wherein the control unit controls drive of the motion compensation optical system based on a combination of output signals of the first motion detection unit and the second motion detection unit.

18. An interchangeable lens as recited in claim 12, wherein the first motion detection unit is located between the aperture unit and the motion compensation optical system.

19. An interchangeable lens as recited in claim 12, wherein the photographic optical system includes a first lens group and a second lens group, and the first motion detection unit is located between the first lens group and the second lens group.

* * * * *